United States Patent [19]

Franz

[11] 4,288,902
[45] Sep. 15, 1981

[54] METHOD OF FORMING A NOTCHED EDGE LOCK SCREW

[76] Inventor: Louis J. Franz, 313 Crane Ave., Royal Oak, Mich. 48067

[21] Appl. No.: 82,140

[22] Filed: Oct. 5, 1979

[51] Int. Cl.³ .............................................. F16B 19/02
[52] U.S. Cl. .................................... 29/407; 403/323; 411/349; 411/378; 411/403
[58] Field of Search .............. 29/407, 526 R; 279/76, 279/77, 83; 85/1 R, 7, 8.6, 9 R, 5 P; 83/136, 140, 146, 698; 403/315, 323

[56] References Cited

U.S. PATENT DOCUMENTS

| | | | |
|---|---|---|---|
| 459,361 | 9/1891 | Gregory | 403/323 |
| 591,798 | 10/1897 | Strauss | 403/323 |
| 872,712 | 12/1907 | Church | 85/9 R |
| 2,017,247 | 10/1935 | Hodge | 279/76 |

*Primary Examiner*—Robert D. Baldwin
*Attorney, Agent, or Firm*—Cullen, Sloman, Cantor, Grauer, Scott & Rutherford

[57] ABSTRACT

Die insert lock screws are formed for threaded engagement within corresponding threaded holes formed in a retainer having a socket within which a die part insert is positioned, with a portion of each of the screw heads normally overlapping the socket and fitted within a groove in the insert. The screw heads each are provided with a circumferentially elongated notch which can be aligned with the adjacent insert surface portion and retaining socket wall portion for disengaging the screw heads from their grooves for thereby unlocking the insert. Each notch is aligned lengthwise, generally perpendicularly to the socket wall so that maximum face to face area contact is provided between the bases of the screw heads and the retainer when the screw heads are tightened against the retainer for locking the insert.

2 Claims, 17 Drawing Figures

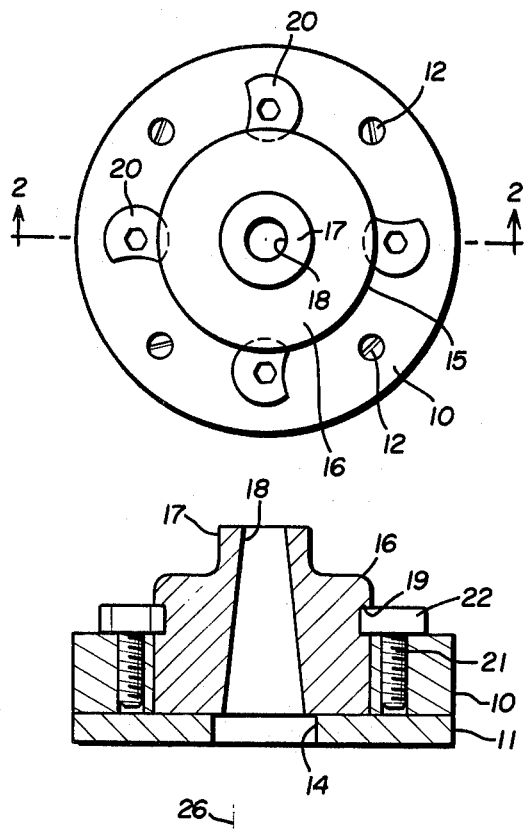
FIG. 1
FIG. 2
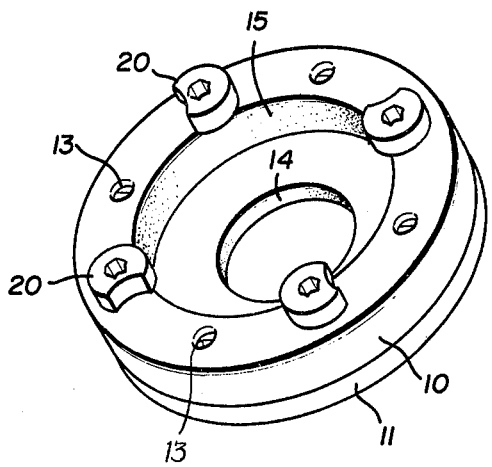
FIG. 3
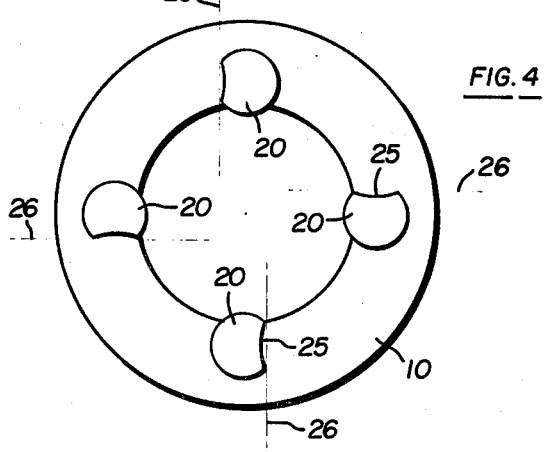
FIG. 4
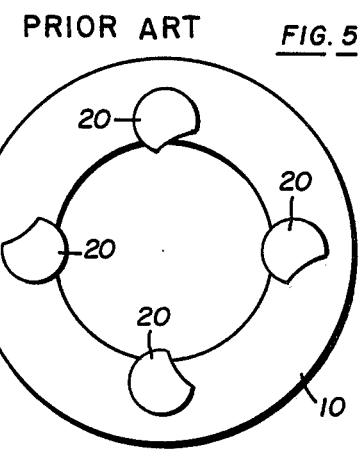
PRIOR ART FIG. 5
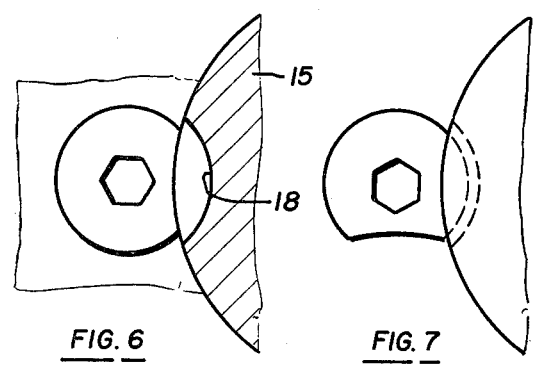
FIG. 6 FIG. 7
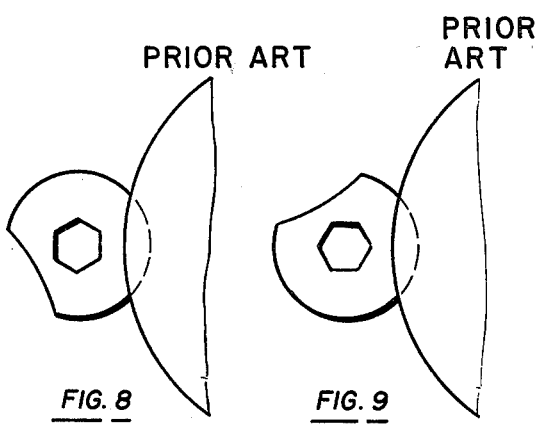
PRIOR ART FIG. 8
PRIOR ART FIG. 9

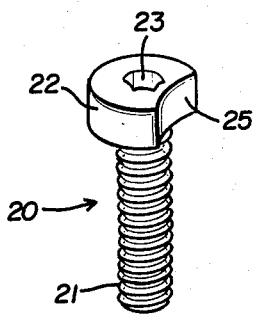
FIG. 10
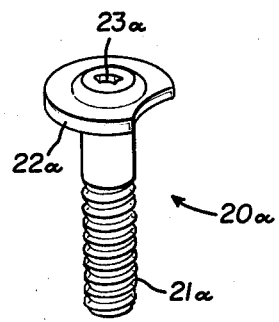
FIG. 11
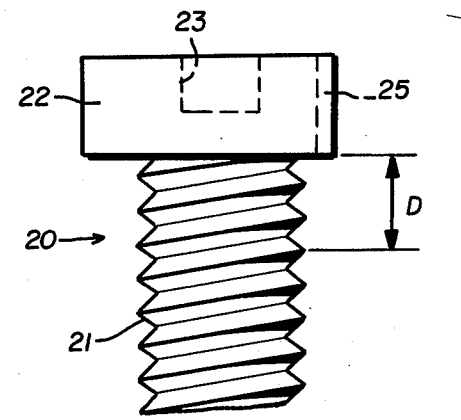
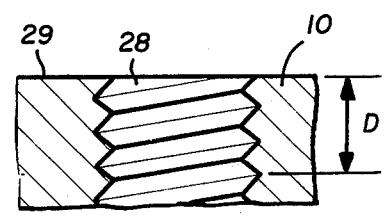
FIG. 12
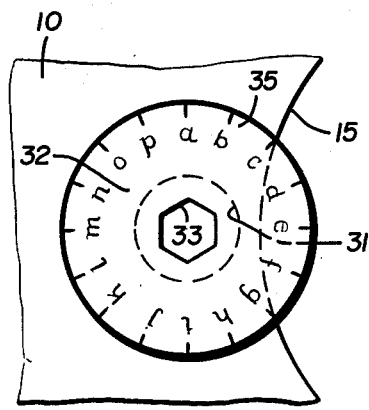
FIG. 13
FIG. 15
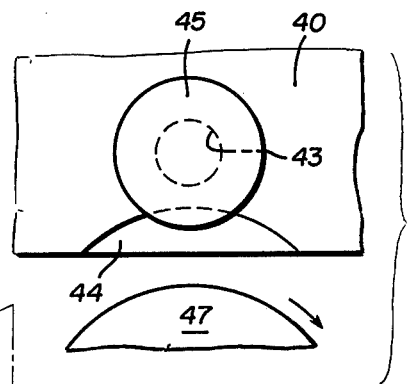
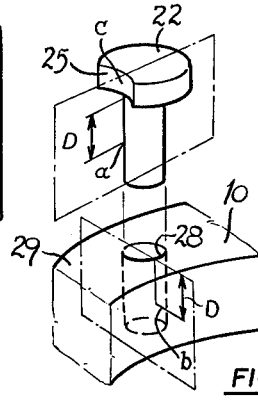
FIG. 14
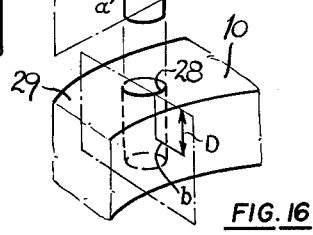
FIG. 16
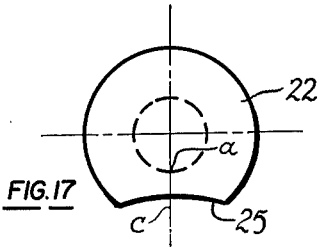
FIG. 17

METHOD OF FORMING A NOTCHED EDGE LOCK SCREW

BACKGROUND OF INVENTION

In stamping presses which are used for blanking, drawing, punching and piercing relatively small sheet metal objects, it is conventional to fasten the dies within retainer plates or rings which, in turn, are fastened to the press platens and the like movable parts. Such dies, including punching and forming dies, are removable from the retaining rings or plates for replacement when desired.

Examples of such type of presses and retainers within which die parts are fastened are illustrated in U.S. Pat. No. 2,089,795 issued Aug. 10, 1937 to Hodge, U.S. Pat. No. 2,699,830 issued Jan. 18, 1955 to Hodge and U.S. Pat. No. 3,213,799 issued Oct. 26, 1965 to Koch. The press illustrated in the Koch patent is of a horizontally movable type which is particularly useful for accurately stamping small sheet metal parts from larger sheets.

In the conventional presses, the retainer rings or plates, normally comprise a relatively thick metal plate which may be circular or polygonal in shape, having a socket which usually is circular. The die is provided with a part which fits within the socket where it is locked during stamping use. The locking mechanism which is conventionally utilized is in the form of a lock screw.

Conventional lock screws, such as is illustrated in U.S. Pat. No. 2,017,247 issued Oct. 15, 1935 to Hodge, comprise a threaded shank and a circular head which is provided with a notch or elongated cut-away. The threaded shank fits within a threaded opening in the retainer and the head is arranged to overlap the socket and to fit into a groove or channel formed in the die part which fits within the socket. Thus, rotation of the screw results in a portion of the screw head fitting into the groove or channel in the die. For unlocking, the screw is rotated oppositely and its notch is aligned with the edge of the socket and the surface of the die part so that the die part can then be removed because the screw head no longer fits within the groove.

That type of locking screw, namely the notched head locking screw has been used for many years for fastening various die inserts, including punches and the like, within retainer sockets. The same lock screws may be used to secure together various die parts or tooling parts which interfit in the same manner as described above.

In typical uses, the tool or die maker provides threaded holes in the retainer using conventional tapping tools for that purpose. The screws are correspondingly threaded. Then such screws are fastened within the threaded or tapped holes as required.

In the past, such screws presented a number of problems, including a tendency to break or loosen, failure of the screw head to provide adequate or complete engagement with the retainer, and the like.

Consequently, the invention herein relates to an improvement in the notched head type of tooling lock screw and in the method of making and using same.

SUMMARY OF INVENTION

The invention herein contemplates utilizing what appears to be a conventional or standard notched head tooling lock screw. I have discovered that by insuring maximum face to face contact with the base of the head and the adjacent seating surface of the retainer, loosening and breaking and similar problems are substantially minimized. Thus, the invention contemplates forming each lock screw so that when it is tightened, its notch is approximately perpendicular to the retainer socket. That is, the notch is arranged with one end located at the socket and the opposite end located on a line which is roughly perpendicular to the socket. This location provides a complete arcuate edge portion of the screw head fitted within the groove of the die insert for locking it in place. Simultaneously, a maximum face to face area contact is provided between the base of the screw head and the retainer surface against which the head is tightened.

In the prior conventional devices, the screw head when tightened down for locking a portion of the head within the insert groove, may have its notch located haphazardly or randomly. That is, the notch may be located partially within the insert groove or may be located entirely remotely from the retainer socket so that either an incomplete arcuate portion of the screw head is fitted within the groove or, more usually, the screw head portion which is most remote from the socket is partially relieved by the notch so that the face to face contact between the screw head and the retainer is minimized or reduced at that point.

The improvement herein contemplates locating the notches of all the screws used, in a roughly perpendicular or radial direction relative to the socket and thereby providing a complete arcuate screw head portion for face to face contact between the screw head and the retainer in the areas diametrically most remote from the socket. With this construction, a substantial increase in performance and life of the part can be anticipated, including improved load and vibration absorption, increased frictional locking forces, etc.

Since lock screws frequently bread or are damaged in use, particularly when removed or loosened for replacement of die parts, it is necessary to replace the screws from time to time. Typically, replacement is difficult because a number of screws must be tried out in order to obtain screws wherein the notch can be located outside of the groove of the die when the screw is tightened for locking purposes. Since screws are typically made in random or haphazard fashion, it is difficult to find a particular screw which fits a particular threaded hole, which necessitates stocking a relatively large number of such screws in order to selectively fit a particular threaded hole with a screw once its original screw is broken or damaged.

The invention herein contemplates a method of pre-selecting or pre-sizing screws relative to pre-existing threaded holes in order to insure that each screw, at all times, is located with its notch roughly perpendicularly or radially to the socket, as described above. The method utilizes a master screw which has an unnotched head that is provided with indicia or markings. The markings are uniformly spaced along the peripheral edge of the head for segmenting the head into a number of equal spaces for measurement purposes. The master is threaded into a typical threaded hole in the retainer and when tightened down, the indicia or markings which delineate the portion of the head which overlaps the retainer socket are noted. With those markings known, screws are selected which have notches immediately adjacent those markings so as to locate the notch perpendicularly to radially when the screw is tightened down. Thus, the user by noting the indicia which intersect the wall defining surface of the socket can immediately order the correct screw.

In order to provide the correct screw, screws may be made using fixtures which have the threaded holes located to correspond with various of the indicia on the head of the master screw. That is, the screws can be pre-made to correspond to different master head markings or can be made by noting the appropriate master head markings and at that point cutting the notch in an un-notched head of a screw to correspond thereto.

By following the procedure of at all times utilizing lock screws which are made especially for the existing pre-determined threaded holes in the retainer, the need for stocking large numbers of screws in a shop for replacement purposes and the problem of finding a particular proper screw for a particular hole is eliminated. That is, the user can simply note the markings on a master and then order and rapidly obtain a screw to match that particular indicia.

As can be seen, an important object of this invetnion is to provide an improved locking screw and method of forming same wherein the maximum amount of head area is at all times located in the area most remote from the socket of the retainer to thereby substantially improve the performance of the locking screw. These and other objects and advantages of this invention will become apparent upon reading the following description, of which the attached drawings form a part.

DECRIPTION OF DRAWINGS

FIG. 1 is a front view of a die retainer ring within which is mounted a die.

FIG. 2 is a cross-sectional view taken in the direction of arrows 2—2 of FIG. 1.

FIG. 3 is a perspective view of the retainer ring with the die removed.

FIG. 4 is a schematic view showing the retainer ring with the lock screws located in locking position.

FIG. 5 is a schematic view similar to FIG. 4, but showing the prior art, haphazard locations of the lock screws.

FIG. 6 is an enlarged, fragmentary view, showing the improved lock screw in unlock or release position with its notch aligned with the edge of the retainer socket.

FIG. 7 is a view similar to FIG. 6, schematically showing the lock screw head in locking position.

FIGS. 8 and 9 are each views similar to FIG. 7, but showing the prior art construction wherein the notches are haphazardly located when the heads are tightened against the retainer seating surface.

FIG. 10 is a perspective view of one common style lock screw, and

FIG. 11 is a perspective view of another style lock screw.

FIG. 12 is an enlarged, fragmentary view, of a lock screw and the threaded hole in the retainer.

FIG. 13 is a view of the head of a master screw, showing the screw inserted in a retainer hole.

FIG. 14 is a perspective view of a fixture for forming the notch on a lock screw, and FIG. 15 is an enlarged, fragmentary view, showing the un-notched screw head mounted within the fixture and the cutter for notching it.

FIG. 16 is a schematic, perspective view showing the relative alignments of the centerlines of the curved notch and corresponding points on the screw thread and hole thread.

FIG. 17 is an end view of the screw showing the radial alignment of the centerlines of the curved notch and a reference point on the crest of the screw thread.

DETAILED DESCRIPTION

Referring to FIG. 1-3, the die retainer ring 10 is shown in a circular or annular form. Conventionally such retainers are either ring shaped or polygonal in shape, such as square. Thus, the ring formation is illustrative for purposes of this application.

A back-up plate 11 is secured to the ring by means of screws 12 extending through openings 13 formed in the ring (see FIGS. 1 and 3). The plate is provided with a central hole 14 for the passage of knock-out pieces in punching operation. The central opening in the ring forms a socket 15.

A die part 16 fits within the socket 15. The die part may be either a complete die or punch or a compound die or punch of a known type. Thus, it is illustrated generally schematically and as representative of conventional die parts. The die is provided with a forming end 17 which may be used for punching or blanking or drawing or the like, along with the mating die parts of an upper die or opposing die, which is not illustrated herein.

A central hole 18 extends through the die for receiving punched out pieces, as for example where washers are stamped upon the die. That is, the central portion which makes up the central hole in a washer is punched through the center of the die and drops through the central hole 18 and out the hole 14 in the back-up plate.

The die is fastened within the retainer socket 15 by a releasable locking means. This includes locking grooves 19 formed in the die for receiving lock screws 20. These lock screws (see FIG. 10) generally comprise a threaded shank 21 and a circular head 22 having a wrench socket 23 for receiving a tool for rotating the screw.

A circumferentially elongated, curved notch or cut-away 25 is formed on the peripheral edge of the head 22. The notch or cut-away is shaped so as to align with the retainer socket 15 and die part.

The invention herein contemplates that when every one of the screws 20 are tightened against the surface of the retainer, the notches 25 of each screw will be aligned along lines 26 which are approximately perpendicular to the adjacent socket surface, that is, approximately radial of the circular socket, as illustrated in FIG. 4.

The threaded shanks of the screws fit within threaded holes 28 formed in the retainer. The surrounding exposed surface of the retainer forms a screw head seating surface 29 at the entry of each of the threaded holes 28 (see FIG. 12).

In operation, the screws 20 are rotated so that their notches are in alignment with the wall defining the socket 15 in the retainer, that is, disengaged from the grooves 19 formed in the die. FIG. 6 shows that position. Now, the die can be removed and a replacement die inserted within the socket. In this manner, the dies can be rapidly changed for different stamping purposes. Once the replacement die is positioned in the socket, the screw 20 is rotated by inserting a suitable wrench in the wrench socket thereof and turning the screw so that it is tightened against the seating surface on the retainer. That position is shown in FIGS. 4 and 7. When the notch is positioned along the roughly radial lines 26, there is a maximum area of face to face contact between the inner or bottom surface of the screw head and the adjacent seating surface of the retainer. Simultaneously, there is a complete arcuate screw head portion positoned within the groove 19 of the die for maximum locking. With this positioning, the maximum resistance to shocks, vibrations and loosening is provided with the maximum strength available because of the large surface to surface contact between the screw and seating surface, particularly in the areas most remote from the socket.

For compound dies, where one die part forms a retainer ring within which another die part is socketed, the lock screw arrangement is the same as that described above. Therefore, the term retainer ring also applies to die parts which function in the same manner.

As illustrated in FIG. 5, 8 and 9, in the past, when the screws 20 were tightened, the notches were haphazardly located as shown for example in FIG. 5. Thus, in haphazard location, frequently the screw head did not have a complete arcuate portion within the die groove, resulting in insufficient strength to resist the forces upon the die. Consequently, to handle this problem, it was necessary to try-out a number of screws in pre-existing holes to the extent possible to try and find a screw which did properly fit the die groove. Even then, it was not always possible to avoid the problem of insufficient area of contact within the grooves.

Likewise, frequently there was a problem of insufficient surface to surface area contact between the bottom of the screw head and the retainer surface, particularly in the areas most remote from the socket which are the areas where there should be maximum contact. FIG. 8 shows the undesirable prior art position which occurred in the conventional device and FIG. 9 shows another example of an undesirable position of the screw head.

As shown in FIG. 12, the invention herein contemplates matching the precise distance D, between points on the crest of the threads on the screw to the bottom of the screw head, to the distance between the corresponding points on roots of the threads and the seating surface 29 on the retainer holes. That is, referring to FIGS. 16 and 17, a point designated as "a", on the crest of a thread, is located a distance D from the bottom of the screwhead. Point "a" is in a plane which includes the radius of both the circular head and the circular segment defining the notch. That is, point "c", which is in that plane, is on the center of the circular notch.

Meanwhile, point "b" located on the root of the hole thread is also located the same distance D from the hole seat 29. Point "b" is in a plane which is 90 degrees out of the phase of the plane containing points "c" and "c" and preferably is aligned with the radius of socket 15. Consequently, when the screw head is tightened against the threaded hole seat 29, the notch is 90 degrees offset from the socket, as illustrated, for example in FIGS. 4 and 7. All the screws are made the same way, i.e., with their distance "D" from their crest point "a" equal to the distances "D" from corresponding hole root points "b". Thus when the planes are at the 90 degree offset location, as illustrated in FIG. 16, the notches of all screws are arranged, as shown in FIG. 4.

The screw may be in the form shown in FIG. 10 or may be in another conventional style such as that shown in FIG. 11 wherein the screw 20a has a threaded shank 21a, that is only partially threaded, and a much thinner head 22a whose center is raised to form a central boss within which the wrench socket 23a is located. Regardless of the style, the distance of the thread crests from the bottom of the screw head are correlated precisely to the distances of the correspondng roots of the threads in the sockets to the seating surface of the retainer.

In cases where the retainer ring or retainer plate is already out in the field and screws are to be replaced, in the past the mechanic had to try out a number of different screws in order to locate screws which would provide the most arcuate contact with the groove, regardless of where the notch was located. Since most shops do not stock such screws and in any event, rarely stock enough screws to give a good selection, it has been difficult and time consuming to locate screws, try them out, and then replace them if they did not fit.

Consequently, in order to provide a method for locating a screw which accurately fits the pre-existing threaded hole, I provide a master screw (see FIG. 13). The master screw has a threaded shank 31 which threads into the threaded hole 28 in the retainer 10. The complete circular head 32 on the master screw is also provided with a wrench socket 33 so that it can be tightened against the seating surface on the retainer.

A large number of indicia 35, which may be in the form of equally spaced apart markings or lines, each identified with a number or letter, is spaced around the peripheral portion of the head. This sub-divides the head into a large number of equal length segments. Such segments are used for determining where the notch should be positioned in order to not be in the groove of the die, but rather to be located along a generally radial line, as illustrated in FIG. 7. Thus, upon tightening the master screw in place, the user can read the markings which delineate the portion of the screw head which overlaps the socket 15. Knowing the two delineating markers, he may then order a screw to match those markings. For example, the markings in FIG. 13 show "c" and "g" as delineating the length of the notch, i.e., the intersection between the circular head portion and the circular socket 15. The user now knows that the screw needed will have four segments which will begin at "g" and then continue through "k" to provide the needed screw. He can then order a screw from this code.

In order to make the required screw, fixtures 40 may be utilized. The shop making the screws may have a number of fixtures 40, each having fastening screws 41 extending through screw holes 42 to fasten it to a cutting machine (not shown).

The threaded hole 43 in the fixture is made to correspond to predetermined positions correlated to the indicia on the master screw head. For example, the hole in the block or fixture shown in FIG. 14 may be made to correspond to the arrangement shown in FIG. 13, that is, requiring a notch to be cut between positions "g" and "k" when the screw head is tightly in contact with its seating surface. Hence, the fixture is provided with a cut-away section 44 and an un-notched lock screw 45 is threaded into the threaded hole 43 to overlap the cut-away 44. As shown in FIG. 15, a cutting wheel 47 is relatively moved into the cut-away 44 to form the notch in the screw head. That screw will now correspond to the required screw for the conditions shown in FIG. 13.

The user can use a number of fixtures, each threaded in such a manner as to correlate to different positions on the master head. Alternatively, a suitable vise or clamp can be used to hold the un-notched screw and to turn the screw into the correct position so that its head is notched to correlate to the master screw determined threaded hole in a retainer.

Having fully described an operative embodiment of this invention I now claim:

1. A method of forming a notched edge lock screw having a threaded shank and a head provided with a notch, and being of the type used for locking a die part insert within a retainer which is provided with a socket for receiving a portion of the insert, and with the insert having a lock-screw head receiving groove aligned with a seating surface formed on the retainer and the seating surface surrounding a threaded lock screw shank receiving opening so that the base of the lock screw head tightly engages the seating surface when a portion of the screw head overlaps the retainer socket and is received within the insert groove for locking within the retainer socket, and the screw head base is spaced a short distance from the seating surface when the screw is loosened relative to the threaded opening for aligning the notch formed on the screw head with the adjacent socket edge portion and insert edge portion so that the insert is unlocked, comprising:

forming an un-notched master screw, which otherwise is a substantial duplicate of the lock screw, with a substantial number of segment markings equally spaced around the peripheral edge portions of its head, so that the head circumference is visually divided into a large number of segments;

applying said master screw into a pre-existing retainer threaded opening and observing the markings which delineate the portion of the socket which is overlapped by the head of the master screw when the master screw is tightly in place;

machining a notch in a lock screw corresponding to, but circumferentially offset relative to, the observed marked overlapping master screw head portions, so as to position the notch with one of its ends at the retainer socket defining wall, so that the notch extends roughly perpendicularly away from the retainer socket defining wall when the lock screw head is tightly in contact with the retainer seat surface;

and thereafter, threadedly applying said lock screw to said preexisting retainer opening for use therein.

2. A method as defined in claim 1 above, and including forming a notch positioning fixture having a threaded opening corresponding to said preexisting threaded opening in the retainer, that is, having the same distance between the crest of the threads and the seat surface as does the retainer, and utilizing that fixture to form the notch in the lock screw according to the overlapped delineating markings on the master screw head, and using said overlapped delineating markings as the means to select the above identified specific fixture.

* * * * *